W. A. NIEMAN.
HORSESHOE.
APPLICATION FILED FEB. 23, 1909.
965,217.
Patented July 26, 1910.
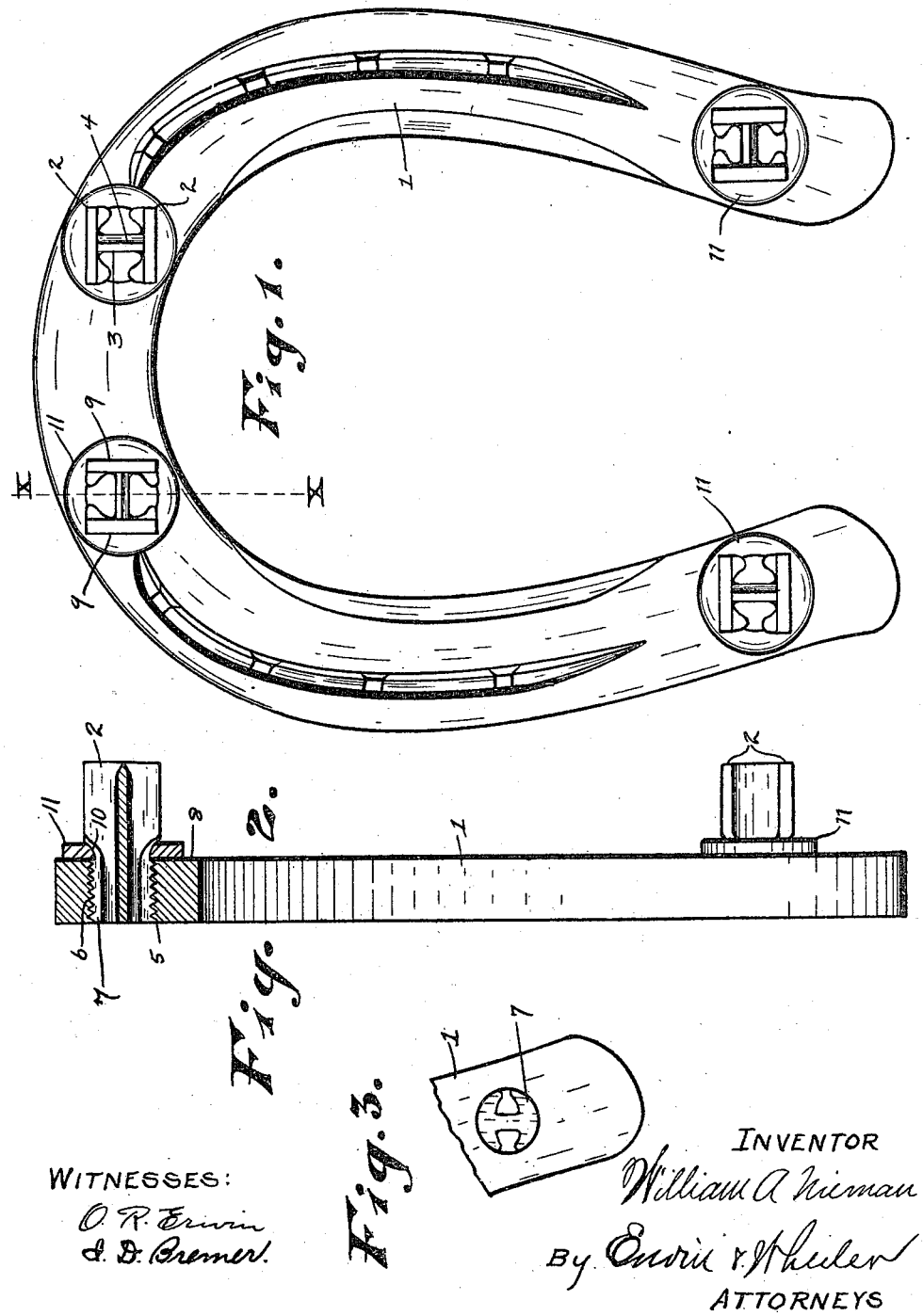
WITNESSES:
O. R. Erwin
A. D. Bremer
INVENTOR
William A. Nieman
By Erwin & Wheeler
ATTORNEYS

UNITED STATES PATENT OFFICE.

WILLIAM A. NIEMAN, OF MILWAUKEE, WISCONSIN.

HORSESHOE.

965,217.  Specification of Letters Patent.  Patented July 26, 1910.

Application filed February 23, 1909. Serial No. 479,601.

*To all whom it may concern:*

Be it known that I, WILLIAM A. NIEMAN, a citizen of the United States, residing at Milwaukee, county of Milwaukee, and State of Wisconsin, have invented new and useful Improvements in Horseshoes, of which the following is a specification.

My invention relates to improvements in that class of horse shoes in which the calks are removably secured to the shoe proper by screw threaded bearings and it pertains more especially, among other things, to the device for preventing the calks from turning and becoming loose in their bearings. In this class of horse shoes, as heretofore constructed, the shank of the calk has been turned down in the threaded aperture of the shoe until the shoulder of the calk is brought into direct contact with the surface of the shoe, whereby the threaded portion of the calk only contacts with and is supported by the shoe, while the outwardly diverging portion of the shank including that part between the shoe and the vertical sides of the calk remains, as heretofore made, unsupported, and experience has demonstrated that calks thus secured are liable to and frequently do become loose in their bearings before they become sufficiently dull to require replacing.

The object of my invention is, among other things, to provide an annular bearing collar having a central aperture for the reception of the shank of the calk of greater diameter than the threaded aperture of the shoe, whereby said collar is adapted to fill the outwardly diverging space between the shoe and the vertical sides of the calk, and whereby the calk is reinforced outside of the shoe proper and thereby relieved from the lateral strain to which it would otherwise be subjected and the liability of its becoming loose or turning in its bearings is entirely overcome.

My invention is further explained by reference to the accompanying drawings, in which—

Figure 1 represents a plan view of an inverted horse shoe embodying my calk retaining device. Fig. 2 is a vertical section, taken on line *x—x* of Fig. 1; and Fig. 3 is a detail, showing the upperside of a portion of the shoe and calk therein.

Like parts are identified by the same reference figures throughout the several views.

1 represents the shoe proper, which is pro-vided with the usual number of toe and heel calks. The calks, as preferably constructed, comprise the two vertical side members 2, 2, which are connected together by the transverse member 3 and said member 3 is preferably provided with a V-shaped edge 4, which is adapted to engage the surface of the ground. The side members 2, 2, converge downwardly toward the aperture 5, in which they have screw threaded bearings 6.

7 represents a shank, which diverges outwardly from the surface 8 of the shoe to the vertical sides 9 of the calk leaving the outwardly diverging bearing 10 which, as heretofore constructed, has been unsupported. By my improvement I provide a bearing collar 11, which is interposed between the upper surface 8 of the shoe and the vertical portion 9 of the calk, whereby the outwardly diverging bearing 10 is supported and reinforced. It will be understood that the calk is turned down firmly against the annular collar 11 until it impinges firmly against it and that said collar performs the two fold function of reinforcing the protruding end of the calk and of acting as a friction bearing to prevent the shank from turning in its threaded aperture. The shank of the calk is formed by bending the walls of the members 2, 2 inwardly at one end and threading their outer surfaces. The intermediate portion, where these walls are only partially inturned, is tapered as shown, and the margins of the members 2, 2, along this tapered portion, are adapted to bite into the collar 11 at a plurality of points when the calk is screwed into position, and as the collar is free to turn, the final turning movement of the calk will cause the collar to rotate with it, so that the biting edges of the calk do not cut away the engaged edges of the collar, but simply become embedded therein. It is, therefore, impossible for the calk to become unscrewed, since it cannot turn independently of the collar, and the frictional bearing surface of the latter upon the shoe is sufficient to prevent further rotation in either direction.

Experience has shown that with shoes in which the reinforcing collars 11 are omitted, the threads of the aperture near the lower surface of the shoe are injured every time a calk is removed and replaced and that when several calks have been thus replaced, the threads of the aperture become so defective as to be incapable of properly holding the calk, while by employing the collar 11, as shown, the threads of the aperture remain uninjured by removing and replacing the calks.

Having thus described my invention, what I claim as new, and desire to secure by Letters Patent is—

1. In a horse shoe of the described class, the combination with a shoe provided with a plurality of screw threaded calk retaining apertures, a plurality of screw threaded calks each having a screw threaded shank closely fitting the aperture of the shoe and outwardly diverging bearings located between the threaded bearing of the shank and the vertical sides of the calks, and a supporting collar interposed between the screw thread on the shank and the outwardly diverging bearing of the calk and adapted to reinforce the calk against lateral strain and prevent the same from becoming accidentally unscrewed from its threaded bearings, said calk having walls, the margins of which are adapted to bite into the collar, and said collar being free to turn with the calk when the latter is screwed into position for use.

2. In a horseshoe of the described class, the combination with a shoe provided with threaded calk receiving apertures, of calks therefor, each comprising a pair of vertical side plates joined along their longitudinal center lines by an integral connecting plate, said side plates being turned inwardly at one end and threaded on their outer surfaces to form a shank adapted to fit a shoe aperture, and a collar interposed between the outer unthreaded end of the calk and the shoe, with the margins of said side plates in binding engagement with the inner margin of the collar at a plurality of points; said collar being otherwise unconnected with the shoe.

In testimony whereof I affix my signature in the presence of two witnesses.

WILLIAM A. NIEMAN.

Witnesses:
  Jas. B. Erwin,
  O. R. Erwin.